(12) United States Patent
Gossmann

(10) Patent No.: US 8,761,306 B2
(45) Date of Patent: Jun. 24, 2014

(54) METHOD TO PREVENT PHENOMENON IN VECTOR MODULATOR TRANSMITTER

(75) Inventor: Timo Gossmann, Neubiberg (DE)

(73) Assignee: Intel Mobile Communications GmbH, Neubiberg (DE)

( * ) Notice: Subject to any disclaimer, the term of this patent is extended or adjusted under 35 U.S.C. 154(b) by 429 days.

(21) Appl. No.: 13/085,984

(22) Filed: Apr. 13, 2011

(65) Prior Publication Data

US 2012/0263217 A1 Oct. 18, 2012

(51) Int. Cl.
*H03C 3/00* (2006.01)

(52) U.S. Cl.
USPC ........... 375/302; 375/290; 375/306; 375/308; 375/307

(58) Field of Classification Search
USPC ........................ 375/302, 290, 306, 308, 307
See application file for complete search history.

(56) References Cited

U.S. PATENT DOCUMENTS

| 4,791,577 | A | 12/1988 | Winter |
| 6,891,907 | B1 | 5/2005 | Mabuchi |
| 7,660,361 | B2 | 2/2010 | Sakoda |
| 2008/0280579 | A1* | 11/2008 | Cloutier et al. ............... 455/259 |

OTHER PUBLICATIONS

U.S. Appl. No. 13/568,214 filed Aug. 7, 2012. 31 Pages.

* cited by examiner

*Primary Examiner* — Kabir A Timory
(74) *Attorney, Agent, or Firm* — Eschweiler & Associates, LLC

(57) ABSTRACT

One embodiment of the present invention relates to an apparatus for preventing remodulation in a transmission chain. A first offset generation circuit selectively introduces a first frequency offset into in-phase (I) and quadrature phase (Q) equivalent baseband signals. A second offset generation circuit selectively introduces a second frequency offset into an oscillator output signal. The frequency of the offset oscillator output signal is divided by a divider to form offset local oscillator signals, which are provided to up-conversion mixers that modulate the offset equivalent baseband signals onto the offset local oscillator signals to generate a composite modulated output signal. The first and second frequency offsets are chosen to have values that cancel during modulation. However, because the second frequency offset shifts the offset oscillator output signal's frequency to a value that is no longer a harmonic of the composite modulated output signal's frequency, remodulation is prevented.

20 Claims, 8 Drawing Sheets

METHOD TO PREVENT PHENOMENON IN VECTOR MODULATOR TRANSMITTER

BACKGROUND OF THE INVENTION

Modern portable communication devices (e.g., cell phones, PDAs, etc.) comprise transmission chains configured to transmit information wirelessly using electromagnetic waves. FIG. 1a illustrates an exemplary direct conversion (homodyne) transmitter 100 that utilizes quadrature modulation to encode data onto a composite modulated output signal, that can be wirelessly transmitted by an antenna, through the use of amplitude modulation (i.e., varying the strength of the output signal) and frequency modulation (i.e., varying the frequency of the output signal).

As shown in FIG. 1a, a baseband processor 102 is configured to generate in-phase (I) and quadrature phase (Q) equivalent baseband signals having a frequency range centered around zero Hz (e.g., −8 MHz to 8 MHz). The I and Q equivalent baseband signals are output from the baseband processor 102 to respective up-conversion mixers 106a and 106b. A local oscillator 104 is configured to generate an oscillator output signal $S_{OSC}$ (e.g., a sin wave) at a high frequency (e.g., 10 GHz), which is provided to a quadrature divider 108 that is configured to divide the frequency of the oscillator output signal $S_{OSC}$ by a division factor to generate local oscillator signals, $LO_I(0°)$ and $LO_Q(90°)$, which are offset by 90°. The local oscillator signals are provided to the up-conversion mixers 106a and 106b, which modulate the I and Q equivalent baseband signals onto the local oscillator signals, thereby up-converting the frequency of the I and Q equivalent baseband signals and generating mixer output signals having a frequency equal to that of the local oscillator signals. The mixer output signals are combined by an adder 110 to form a composite modulated output signal $S_{COMP}$ that is provided to one or more amplification stages 112 before being received by an antenna 114 for wireless transmission.

The one or more amplification stages 112 are configured to amplify the composite modulated output signal $S_{COMP}$, having a small amount of energy, to form a transmitter output signal $S_{T\_OUT}$ with a larger amount of energy. However, since the oscillator output signal $S_{OSC}$ is at substantially the same frequency as the composite modulated output signal $S_{COMP}$, the output signal of the one or more amplification stages 112 (or any higher harmonic frequency of it) may interfere with operation of the local oscillator 104 (e.g., shift and/or modify the frequency of the oscillator output signal), which is also at a multiple of the output center frequency, due to the LO-frequency division, and is therefore susceptible to external disturbances. Such external disturbances may result in spurious emissions being output from the transmitter 100.

For example, FIG. 1b illustrates frequency spectrum diagrams corresponding to transmitter 100. Frequency spectrum diagram 116 illustrates the frequency $f_{OSC}$ of the oscillator output signal $S_{OSC}$ and the frequency $f_{COMP}$ of the composite modulated output signal $S_{COMP}$ (i.e., substantially equal to the frequency of the local oscillator signals, $LO_I(0°)$ and $LO_Q(90°)$). The frequency $f_{COMP}$ is equal to the frequency $f_{OSC}$ divided by a division factor (e.g., 2 or 4), as described above.

Referring to frequency spectrum diagram 118, the frequency $f_{COMP}$ of the composite modulated output signal will have harmonic frequencies having a reduced power. The power of the harmonic frequencies decreases with each order of harmonic, but since the division factor between the $f_{OSC}$ and $f_{COMP}$ is typically small, the harmonic frequencies may be strong enough to disturb operation of the local oscillator 104. Therefore, since the frequency $f_{OSC}$ is substantially equal to first harmonic frequency, the first harmonic frequency may interfere with the frequency $f_{OSC}$ causing remodulation (i.e., the superposition of spurious harmonic frequencies onto frequency $f_{OSC}$).

Furthermore, as shown in frequency spectrum diagram 120, since the first harmonic frequency $f_{COMP}$ is substantially equal to frequency $f_{OSC}$, the quadrature divider 108 may perform division of both frequency $f_{OSC}$ and the first harmonic frequency, resulting in a heavily disturbed spectrum around frequency $f_{COMP}$ and significant phase error in composite modulated output signal $S_{COMP}$ that may degrade the quality of transmitter output signal $S_{T\_OUT}$ at antenna 114.

BRIEF DESCRIPTION OF THE DRAWINGS

FIG. 1b illustrates frequency spectrum diagrams corresponding to the transmitter of FIG. 1a.

DETAILED DESCRIPTION OF THE INVENTION

Figure 1A:
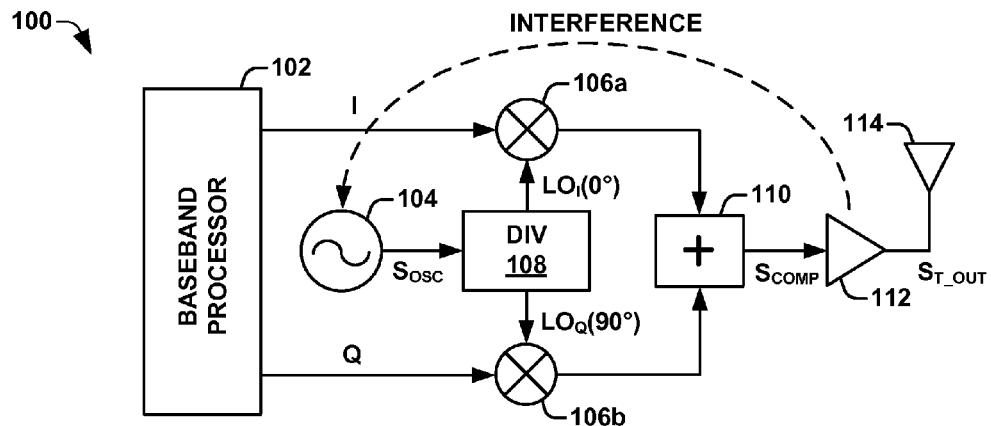
FIG. 1a illustrates an exemplary direct conversion (homodyne) transmitter that utilizes quadrature modulation to generate a wireless transmission signal.
Figure 1B:
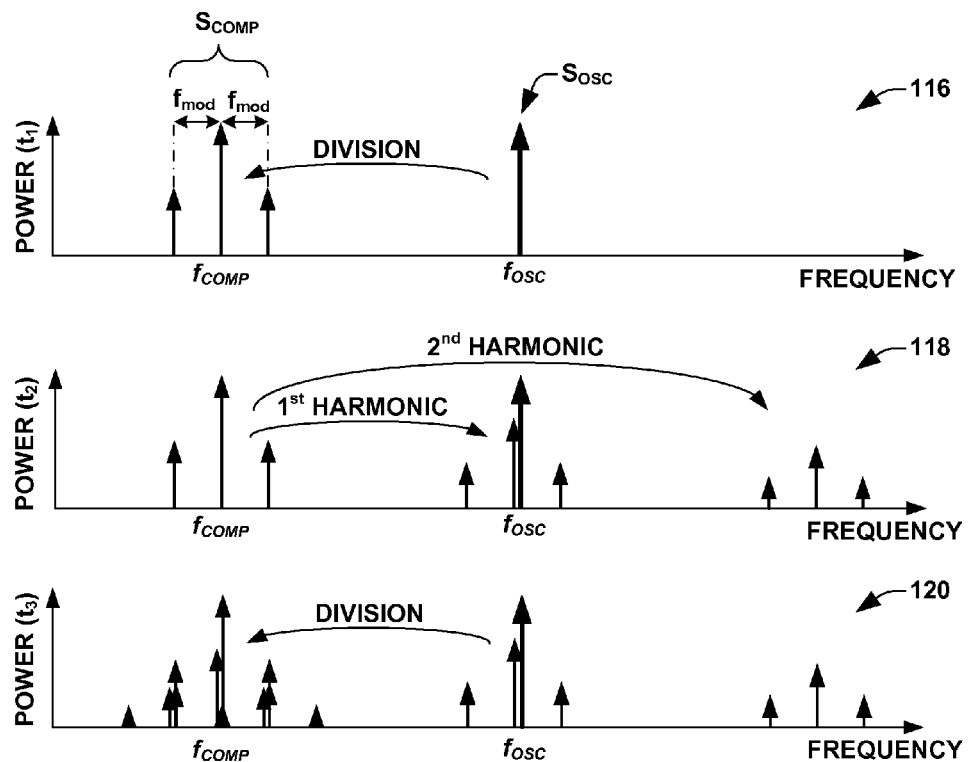

The present invention will now be described with reference to the attached drawing figures, wherein like reference numerals are used to refer to like elements throughout, and wherein the illustrated structures and devices are not necessarily drawn to scale.

Some aspects of the present disclosure provide for a transmission circuit configured to avoid remodulation. In one embodiment, the method and apparatus comprise a first offset generation circuit configured to selectively introduce a first frequency offset into in-phase (I) and quadrature phase (Q) equivalent baseband signals generated by a digital signal conditioning unit (e.g., baseband processor). A second offset generation circuit is configured to selectively introduce a second frequency offset into an oscillator output signal, generated by a local oscillator. The frequency of the offset oscillator output signal is divided by a quadrature divider to form offset local oscillator signals, which are provided to first and second up-conversion mixers that modulate the offset equivalent baseband signals onto the offset local oscillator signals to generate a composite modulated output signal. The first and second offset values are chosen to have a relationship that allows for the frequency of the composite modulated output signal to remain unchanged by the frequency offsets (i.e., during modulation the first and second frequency offsets cancel). However, because the second frequency offset shifts the frequency of the offset oscillator output signal to a value that is no longer a harmonic of the frequency of the composite modulated output signal, remodulation is avoided.

Figure 2:
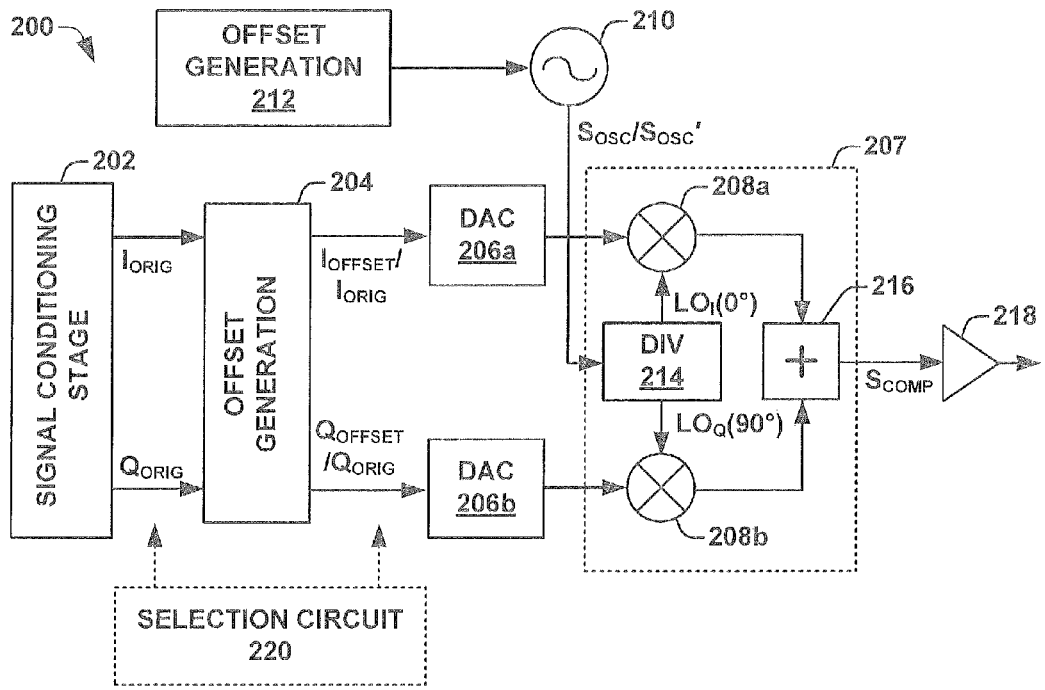
FIG. 2 illustrates a first embodiment of a transmission circuit configured to prevent remodulation.

FIG. 2 illustrates a first embodiment of a transmission circuit 200 configured to prevent remodulation. The transmission circuit 200 comprises a first offset generation circuit 204 and a second offset generation circuit 212. The first offset generation circuit 204 is configured to selectively introduce a first frequency offset into in-phase (I) and quadrature phase (Q) equivalent baseband signals generated by a digital signal conditioning unit 202. The first frequency offset changes the frequency of the equivalent baseband signals by a first predetermined amount. A second offset generation circuit 212 is configured to introduce a second frequency offset into an oscillator output signal generated by a local oscillator 210. The second frequency offset changes the frequency of the oscillator output signal by a second predetermined amount.

A modulation circuit 207 is configured to perform a modulation of the offset equivalent baseband signals onto offset local oscillator output signals, formed from the oscillator output signal, to generate a composite modulated signal $S_{COMP}$. By choosing a specific relationship between the values of the first and second frequency offsets, the modulation cancels the first and second frequency offsets so that the frequency of the offset oscillator output signal is not overlaid with harmonics of the composite modulated output signal (i.e., so that harmonic frequencies of the composite modulated output signal do not disturb/interrupt the local oscillator 210).

More particularly, referring again to FIG. 2, the signal conditioning unit 202 (e.g., baseband processor) is configured to generate modulation information that is split into digital original in-phase (I) and quadrature phase (Q) equivalent baseband signals having a frequency range centered around zero Hz (e.g., −8 MHz to 8 MHz). The original in-phase ($I_{ORIG}$) and quadrature phase ($Q_{ORIG}$) equivalent baseband signals are provided to a first offset generation circuit 204 configured to selectively introduce the first frequency offset (e.g., comprising KHz or MHz frequency offset) into the original in-phase and quadrature phase equivalent baseband signals, $I_{ORIG}$ and $Q_{ORIG}$, to generate offset in-phase $I_{OFFSET}$ and offset quadrature phase $Q_{OFFSET}$ equivalent baseband signals.

The transmission circuit 200 is configured to operate in a bypass mode or in an offset mode. Operation in the bypass mode will result in the original equivalent baseband signals, $I_{ORIG}$ and $Q_{ORIG}$, being provided to respective digital-to-analog converters, 206a and 206b, located downstream of the first offset generation circuit 204. Operation in the offset mode will result in the offset equivalent baseband signals, $I_{OFFSET}$ and $Q_{OFFSET}$, being provided to respective the digital-to-analog converters, 206a and 206b. The digital-to-analog converters, 206a and 206b, are configured to convert the digital equivalent baseband signals to analog equivalent baseband signals.

In one embodiment, a selection circuit 220 (e.g., comprising one or more switches, one or more multiplexors, etc.) may be located upstream or downstream of the first offset generation circuit 204. The selection circuit 220 may be configured to selectively provide the original or offset equivalent baseband signals to the digital-to-analog converters 206, so that either one of the original in-phase equivalent baseband signal $I_{ORIG}$ or the offset in-phase equivalent baseband signal $I_{OFFSET}$ are selectively provided to digital-to-analog converter 206a, while one of the original quadrature phase equivalent baseband signal $Q_{ORIG}$ or the offset quadrature phase equivalent baseband signal $Q_{OFFSET}$ are selectively provided to digital-to-analog converter 206b.

A second offset generation circuit 212 is coupled to local oscillator 210 (e.g., a digitally controlled oscillator, a voltage controlled oscillator, etc.). The second offset generation circuit 212 is configured to selectively cause the local oscillator 210 to vary the frequency of an oscillator output signal $S_{OSC}$ by introducing a second frequency offset (e.g., comprising KHz or MHz frequency offset) into the oscillator output signal. In particular, when the transmission circuit 200 operates in the bypass mode the second offset generation circuit 212 causes the local oscillator 210 to generate an original oscillator output signal $S_{OSC}$ without the second frequency offset. Alternatively, when the transmission circuit 200 operates in the offset mode the second offset generation circuit 212 causes the local oscillator 210 to generate an offset oscillator output signal $S_{OSC}'$ comprising the second frequency offset.

The oscillator output signal (e.g., the original oscillator signal $S_{OSC}$ or the offset oscillator signal $S_{OSC}'$) is provided to a quadrature divider 214. The quadrature divider 214 is configured to divide the frequency of the oscillator output signal by a division factor D to generate local oscillator signals. As shown in FIG. 2, the quadrature divider 214 generates a first local oscillator signal $LO_I(0°)$ and a second local oscillator signal $LO_Q(90°)$, wherein the first and second local oscillator signals are offset by 90°. The local oscillator signals are respectively provided to the up-conversion mixers 208a and 208b (e.g., a first local oscillator signal is provided to mixer 208a and a second local oscillator signal offset by 90° is provided to mixer 208b, or vice versa).

The analog equivalent baseband signals, output from DAC 206a and 206b, are also provided to the up-conversion mixers 208a and 208b. The up-conversion mixers 208a and 208b are configured to modulate the analog equivalent baseband signals onto the local oscillator signals to generate mixer output signals, which are combined by an adder 216 to form a composite modulated output signal $S_{COMP}$ having amplitude and phase modulation. The composite modulated output signal $S_{COMP}$ is provided to one or more amplification stages 218 before being received by a downstream antenna for transmission.

As provided herein, the first frequency offset may have a relationship with the second frequency offset that causes the modulation to cancel the first and second frequency offsets. In other words, the composite modulated output signal generated from the offset equivalent baseband and offset local oscillator signals is equal to frequency of the composite modulated output signal generated from original equivalent baseband and original local oscillator signals. Because the frequency of a composite modulated output signal $S_{COMP}$ remains unchanged by the introduction of frequency offsets, the introduction of the second frequency offset shifts the offset oscillator output signal's frequency to a frequency value is no longer a harmonic frequency of the composite modulated output signal (e.g., the value of the offset oscillator output signal is not a harmonic of the composite modulated output signal, but rather the offset oscillator output signal has a frequency equal to a harmonic of the composite modulated output signal plus the second frequency offset), and therefore avoids remodulation. In one embodiment, the first and second frequency offsets may be predetermined so as to satisfy the relationship without having to perform real time calculations.

Figure 3:
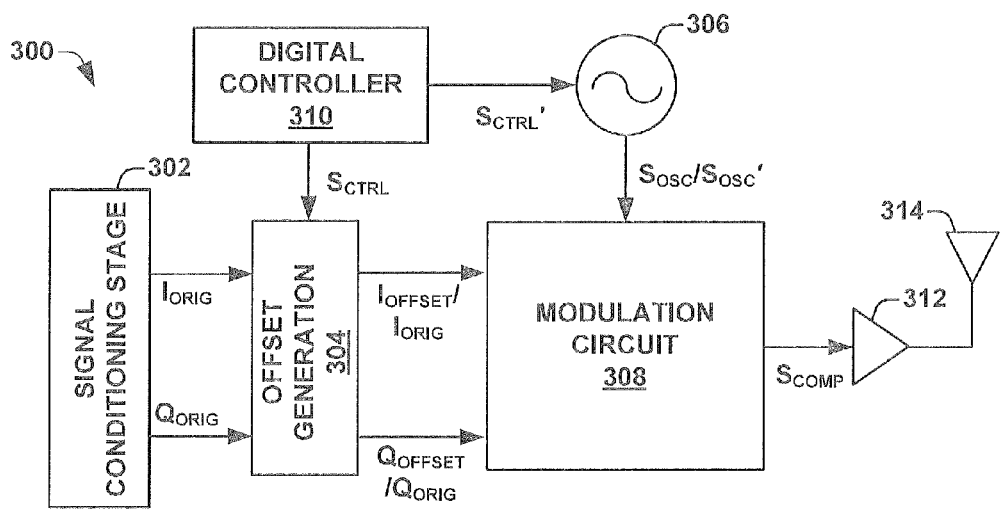
FIG. 3 illustrates another embodiment of a transmission circuit 300 comprising a digital controller configured to control operation of the transmission circuit.

FIG. 3 illustrates another embodiment of a transmission circuit 300 comprising a digital controller 310 configured to control operation of the transmission circuit. As shown in FIG. 3, the transmission circuit 300 comprises a signal conditioning unit 302 (e.g., digital signal conditioning unit) configured to generate in-phase and quadrature phase equivalent baseband signals, $I_{ORIG}$ and $Q_{ORIG}$. A first offset generation circuit 304 located downstream of signal conditioning unit 302 selectively introduces a first frequency offset into original baseband equivalent signals, $I_{ORIG}$ and $Q_{ORIG}$, to form offset baseband equivalent signals $I_{OFFSET}$ and $Q_{OFFSET}$. A local oscillator 306 is configured to selectively introduce a second frequency offset into an oscillator output signal $S_{OSC}$ to form an offset oscillator output signal $S_{OSC}'$.

A digital controller 310 controls operation of the transmission circuit 300 by operating the transmission circuit in a bypass mode or in an offset mode. In the bypass mode of operation the digital controller provides a first control signal $S_{CTRL}$ to first offset generation circuit 304, which causes first offset generation circuit 304 to output original equivalent baseband signals $I_{ORIG}$ and $Q_{ORIG}$ to modulation circuit 308. In the bypass mode of operation the digital controller also outputs a second control signal $S_{CTRL}'$ to local oscillator 306 configured to generate a variable frequency signal. The second control signal $S_{CTRL}'$ causes local oscillator 306 to output an original oscillator output signal $S_{OSC}$ to modulation circuit 308. The modulation circuit 308 modulates the original equivalent baseband signals onto original local oscillator signals, formed from the original oscillator output signal $S_{OSC}$, to generate a modulated composite output signal $S_{COMP}$ having a first frequency having harmonics with a frequency substantially equal to the frequency of the original oscillator output signal $S_{OSC}$.

In the offset mode of operation the digital controller provides the first control signal $S_{CTRL}$ to first offset generation circuit 304, which causes first offset generation circuit 304 to output offset equivalent baseband signals $I_{OFFSET}$ and $Q_{OFFSET}$ to modulation circuit 308, and the second control signal $S_{CTRL}'$ to local oscillator 306, which causes local oscillator 306 to output an offset oscillator output signal $S_{OSC}'$ to modulation circuit 308. The modulation circuit 308 modulates the offset equivalent baseband signal onto offset local oscillator signals, formed from the offset oscillator output signal, to generate a modulated composite output signal $S_{COMP}$ having the first frequency. Because during the offset operation mode the oscillator output signal is shifted by a second predetermined frequency value, the frequency of the offset oscillator output signal is not overlaid with harmonics of the first frequency of the composite modulated output signal $S_{COMP}$.

It will be appreciated that in one embodiment, the relationship between the first and second frequency offsets may be chosen to satisfy an offset condition. In one embodiment the offset condition may comprise the second frequency offset ($f_{offset2}$) being equal to the opposite numeric value of the first frequency offset ($f_{offset1}$) multiplied by a division factor (D) (i.e., $f_{offset2}=-D*f_{offset1}$). It will be appreciated that in alternative embodiments, the offset condition may vary to accommodate different mixer outputs, such as for example, a mixer output signal having a frequency that is equal to the absolute value of the frequency of an offset oscillator signal ($f_{OSC}+f_{offset2}$) divided by the division factor (D), subtracted from the frequency of the spectrum of an offset equivalent baseband signal ($f_{bb}+f_{offset1}$).

Figure 4:
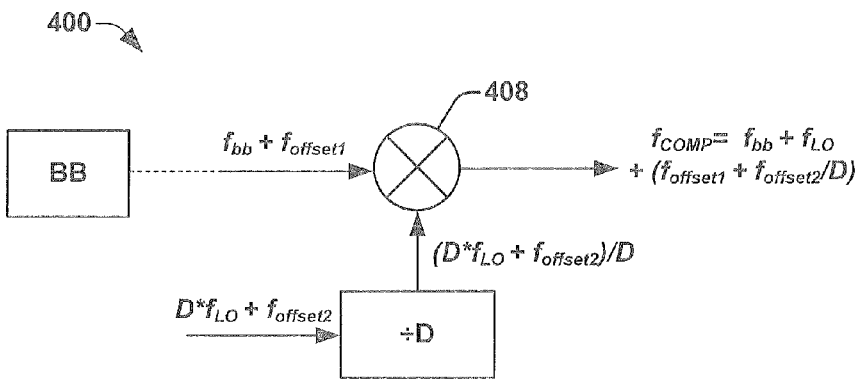
FIG. 4 illustrates a diagram showing operation of a mixer, as provided herein.

FIG. 4 illustrates a diagram 400 showing operation of a mixer, as provided herein, particularly illustrating the effect of an offset condition. As shown in FIG. 4, in one embodiment, the signal output from a mixer 408 (e.g., corresponding to up-conversion mixers 208a or 208b) has a frequency ($f_{COMP}$) that may equal to the frequency of the spectrum of an offset equivalent baseband signal ($f_{bb}+f_{offset1}$) added to the frequency of an offset oscillator output signal ($f_{OSC}+f_{offset2}$) divided by the division factor (D) (i.e., frequency of mixer output=$f_{bb}+f_{OSC}/D+f_{offset1}+f_{offset2}/D$).

Such an offset condition between the first and second frequency offsets results in a composite modulated output signal having a frequency $f_{COMP}$ that is equal to the frequency of a composite modulated output signal generated without the first and second frequency offsets present, since:

$$f_{COMP}=f_{bb}+f_{offset1}+(f_{OSC}+f_{offset2})/D$$

$$f_{COMP}=f_{bb}+f_{offset1}+(f_{OSC}+-D*f_{offset1})/D$$

$$f_{COMP}=f_{bb}+f_{offset1}+f_{OSC}/D-f_{offset1}$$

$$f_{COMP}=f_{bb}+f_{OSC}/D$$

Since the frequency $f_{bb}$ of the equivalent baseband signal is centered around zero hertz, the frequency $f_{COMP}$ of the composite modulated output signal is centered around a value that is equal to the frequency of the local oscillator signals, $f_{OSC}/D$.

Therefore, although the second frequency offset $f_{offset2}$ increases the frequency of the oscillator output signal, the frequency of the composite modulated output signal remains unchanged due to the introduction of the first frequency offset $f_{offset1}$ into the equivalent baseband signal, and therefore the transmission circuit provided herein avoids remodulation.

Figure 5:
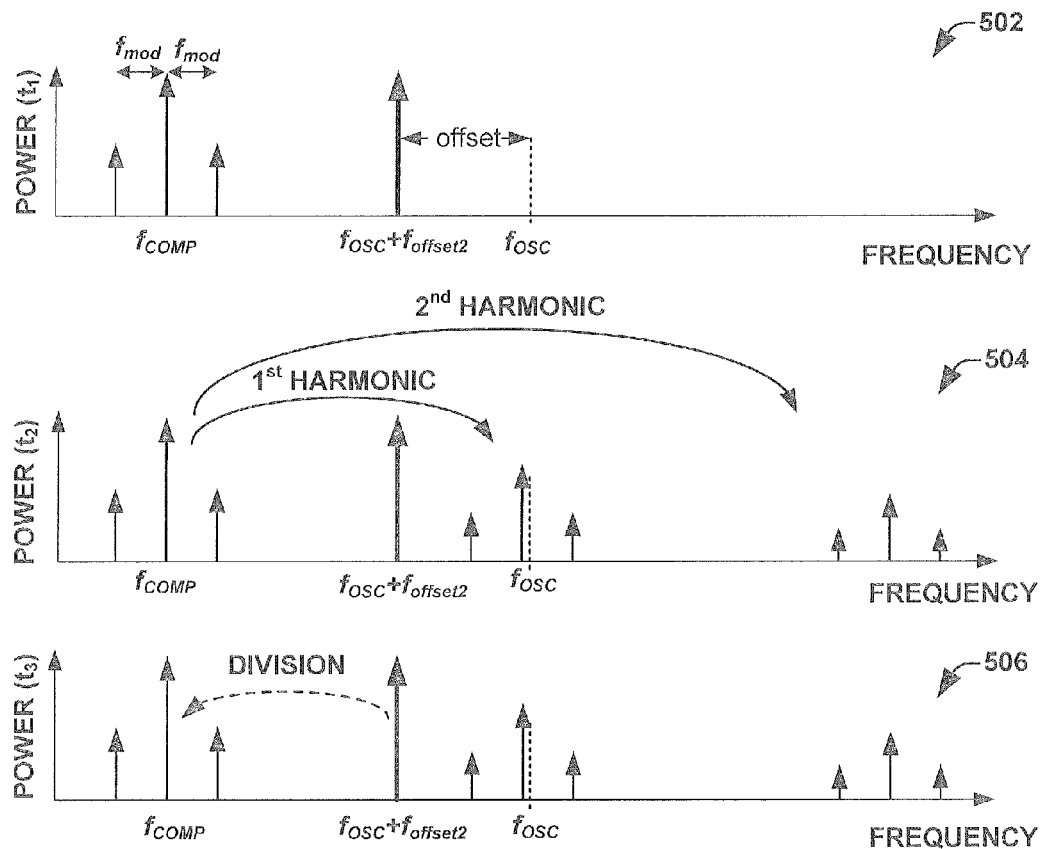
FIG. 5 illustrates a frequency spectrum corresponding to a transmission circuit configured to prevent remodulation, as provided herein.

FIG. 5 illustrates frequency spectrum diagrams corresponding to a transmission circuit configured to prevent remodulation. Frequency spectrum 502 illustrates the frequency $f_{OSC}$ of the non-offset, original oscillator output signal, the frequency $f_{OSC}+f_{offset2}$ of the offset oscillator output signal, and the frequency of the composite modulated output signal $f_{COMP}$. The frequency $f_{OSC}+f_{offset2}$ of the offset oscillator output signal is equal to the frequency $f_{OSC}$ of the non-offset, original oscillator output signal plus a second frequency offset $f_{offset2}$ (e.g., shown in FIG. 5 as a negative offset). It will be appreciated that although the second frequency offset $f_{offset2}$ is illustrated in FIG. 5 as a negative value, that this is a non-limiting embodiment and that in alternative embodiments the second frequency offset $f_{offset2}$ may comprise a positive value (e.g., in which case the first frequency offset would comprise a negative value).

Frequency spectrum 504 illustrates harmonics of the frequency $f_{COMP}$ of the composite modulated output signal. The first harmonic of the frequency $f_{COMP}$ is substantially equal to the frequency $f_{OSC}$ of the original oscillator output signal, but is not substantially equal to the frequency $f_{OSC}+f_{offset2}$ of the offset oscillator output signal. This is because the frequency $f_{COMP}$ of the composite modulated output signal is generated based upon the frequency $f_{OSC}+f_{offset2}$ of the offset oscillator output signal divided by a division factor D and a frequency of an offset equivalent baseband signal having a first frequency offset, wherein the first and second frequency offsets cancel during modulation. Therefore, as shown in frequency spectrum 504 the harmonic frequencies of the frequency $f_{COMP}$ do not interfere with the frequency $f_{OSC}+f_{offset2}$ of the offset oscillator output signal and therefore remodulation is avoided (i.e., the superposition of the harmonic frequencies onto the frequency of the oscillator output signal).

Accordingly, as shown in frequency spectrum 506, since the first harmonic frequency is not substantially equal to the frequency $f_{OSC}+f_{offset2}$ of the offset oscillator output signal, the divider does not perform division of both the offset oscillator output signal frequency and the first harmonic frequency. Rather the divider divides the frequency $f_{OSC}+f_{offset2}$ of the offset oscillator output signal, without dividing the first harmonic frequency, so as not to form a heavily disturbed spectrum around the frequency of the local oscillator (e.g. $f_{COMP}$).

Figure 6:
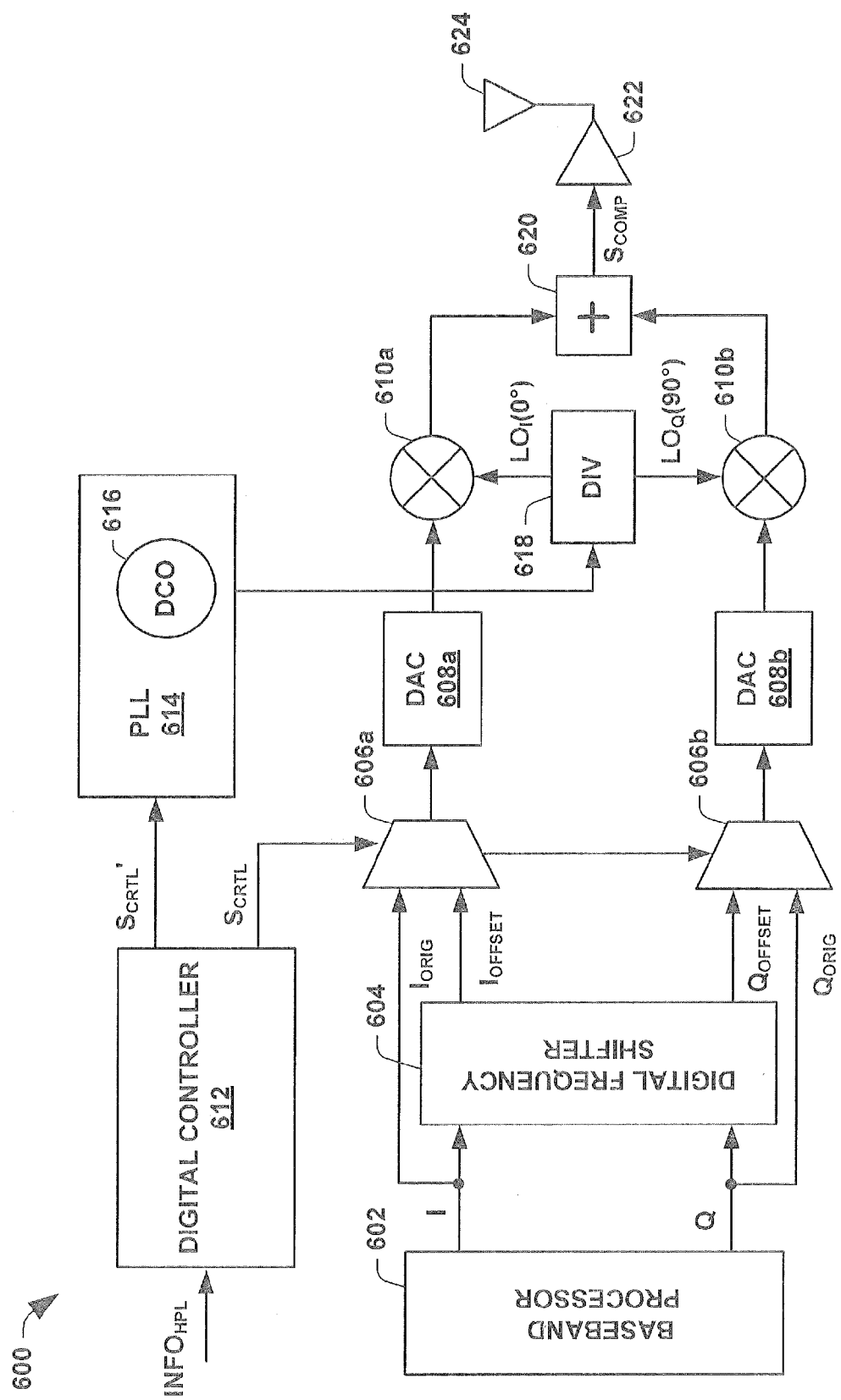
FIG. 6 illustrates a more detailed embodiment of a transmission circuit configured to prevent remodulation.

FIG. 6 illustrates a more detailed embodiment of a transmission circuit 600 configured to prevent remodulation. A baseband processor 602 is configured to generate modulation information that is split into digital in-phase (I) and quadrature phase (Q) equivalent baseband signals in a frequency range around zero Hz. The I and Q equivalent baseband signals are provided to a digital frequency shifter 604 configured to introduce a first frequency offset into the original in-phase and quadrature phase equivalent baseband signals, $I_{ORIG}$ and $Q_{ORIG}$, to generate an offset in-phase equivalent baseband signal $I_{OFFSET}$ and an offset quadrature phase equivalent baseband signal $Q_{OFFSET}$.

The original and the offset in-phase equivalent baseband signals are provided to a first multiplexor 606a. The original and the offset quadrature-phase equivalent baseband signals are provided to a second multiplexor 606b. The first and second multiplexors, 606a and 606b, are operated according to a first control signal $S_{CRTL}$ provided by a digital controller 612. In particular, the digital controller 612 may be configured to operate the transmission circuit 600 in a bypass mode or in an offset mode. Operation in the bypass mode will result in the multiplexors, 606a and 606b, providing the original equivalent baseband signals, $I_{ORIG}$ and $Q_{ORIG}$, to digital-to-analog converters, 608a and 608b. Operation in the offset mode will result in the multiplexors, 606a and 606b, providing the offset equivalent baseband signals, $I_{OFFSET}$ and $Q_{OFFSET}$, to the digital-to-analog converters, 608a and 608b. It will be appreciated that in various embodiments, the first and second multiplexors, 606a and 606b, may be replaced with other selection means such as electronic switches, for example.

As shown in FIG. 6, the digital controller 612 is also coupled to a tunable circuit 614, such as a phase locked loop, configured to selectively provide a desired frequency for the oscillator output signal $S_{OSC}$. In one embodiment the tunable circuit 614 may comprise a digital controlled oscillator (DCO) 616 configured to generate an oscillator output signal (e.g., typically comprising a single frequency signal). The digital controller 612 is configured to provide a second control signal $S_{CTRL}$ to the tunable circuit 614 and/or DCO 616 that causes the tunable circuit 614 and/or DCO 616 to selectively vary the frequency of an oscillator output signal $S_{OSC}$ by a second frequency offset. In particular, operation in the bypass mode will cause the tunable circuit 614 and/or DCO 616 to generate an original oscillator output signal $S_{OSC}$ without a second frequency offset. Operation in the bypass mode will cause the tunable circuit 614 and/or DCO 616 to generate an offset oscillator output signal $S_{OSC}'$ comprising a second frequency offset.

The digital controller 612 may selectively choose an operating mode to avoid a potentially harmful situation in the signal output from the transmission circuit. For example, if the digital controller 612 anticipates (e.g., based upon higher protocol layer information $INFO_{HPL}$) that the outputs signal of the transmission circuit may comprise a potentially harmful situation (e.g., remodulation of the output signal onto the oscillator output signal frequency), the digital controller 612 may switch from a bypass mode to an offset mode. In one embodiment, the digital controller 612 may determine a potentially harmful situation by calculating a figure of merit relating to the output signal. The figure of merit may be determined based upon characteristics of a transmission circuit output signal (e.g., number of subcarriers or resource blocks used for transmission, a frequency of the subcarriers or resource blocks, a bandwidth of the transmission, etc.). The figure of merit may be compared to one or more metrics (e.g., predetermined metrics) that are chosen to prevent remodulation.

In one embodiment, the figure of merit may be determined based upon information about an output signal of the transmission circuit obtained through higher protocol layer information $INFO_{HPL}$ received by the digital controller 612. In one embodiment, the information about an output signal of the transmission circuit (e.g., higher protocol layer information $INFO_{HPL}$) may comprise information relating to transmission power of the transmission circuit 600. In another embodiment, the information about an output signal of the transmission circuit (e.g., higher protocol layer information $INFO_{HPL}$) may comprise information relating to a number and/or a position of subcarriers in a channel bandwidth used by the transmission circuit 600. In one particular embodiment, wherein the transmission circuit utilizes a long term evolution (LTE) mobile communication standard, the information about an output signal of the transmission circuit (e.g., higher protocol layer information $INFO_{HPL}$) may comprise information relating to a number and/or a position of requested resource blocks (e.g., the number of resource blocks in proximity to the center of a transmission channel used by the transmission circuit).

For example, if higher protocol layer information indicates that the signal output from the transmission circuit is to have a relatively low transmission power, which will not cause composite modulated output signal harmonics to interfere with local oscillator operation, the digital controller 612 may cause the transmission circuit to operate in a bypass mode. However, if higher protocol layer information indicates that the signal output from the transmission circuit is to have a relatively high transmission power, which will cause composite modulated output signal harmonics to interfere with local oscillator operation, the digital controller 612 may switch the transmission circuit to operate in an offset mode.

The oscillator output signal $S_{OSC}$ (e.g., the original oscillator signal or the offset oscillator signal) is provided to a quadrature divider 618. The quadrature divider 618 is configured to divide the frequency of the oscillator output signal by a division factor D to generate a first local oscillator signal) $LO_I(0°)$ and a second local oscillator signal $LO_Q(90°)$, wherein the first and second local oscillator signals are offset by 90°. The local oscillator signals are respectively provided to the up-conversion mixers, 610a and 610b, which mix the analog signals output from DAC, 608a and 608b, with the local oscillator signals ($LO_I(0°)$ and $LO_Q(90°)$) to generate mixer output signals. The mixer output signals are combined by an adder 620 to form a composite modulated output signal $S_{COMP}$ having amplitude and phase modulation. The composite modulated output signal $S_{COMP}$ is provided to one or more amplification stages 622 before being received by a downstream antenna 624 for transmission. Since the second frequency offset shifts the frequency of the offset oscillator output signal to a value that is no longer a harmonic of the frequency of the composite modulated output signal, remodulation is prevented.

Although the FIGS. 2-6 illustrate transmission circuits configured to selectively introduce a second frequency offset to an oscillator output signal before the oscillator output signal is divided to generate local oscillator signals, it will be appreciated that these are non-limiting embodiments of the present invention. In alternative embodiments, the second frequency offset may be selectively introduced into local oscillator signals generated from a divided oscillator output signal not having the second frequency offset (i.e., the second frequency offset may be selectively introduced downstream of a quadrature divider).

Figure 7:
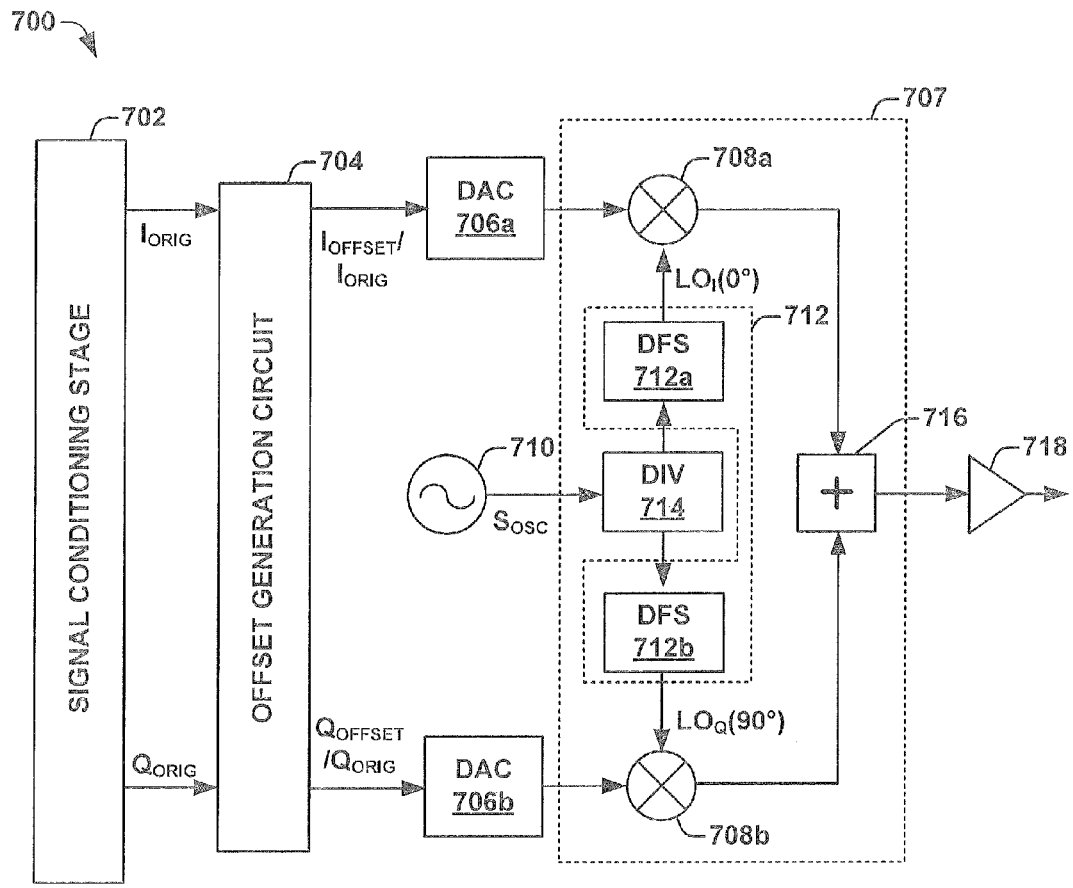
FIG. 7 illustrates an exemplary embodiment of a transmission circuit 700 having a second offset generation circuit located downstream of a quadrature divider

For example, FIG. 7 illustrates an exemplary embodiment of a transmission circuit 700 having a second offset generation circuit 712 located downstream of a quadrature divider 714. As illustrated in FIG. 7, the transmission circuit 700 comprises a first offset generation circuit 704 configured to selectively introduce a first frequency offset into in-phase (I) and quadrature phase (Q) equivalent baseband signals generated by a signal conditioning unit 702. The offset generation circuit selectively provides either the original or offset equivalent baseband signals to the digital-to-analog converters 706, depending on a mode of operation (e.g., described supra in relation to FIG. 2).

A local oscillator 710 is configured to provide an original oscillator output signal $S_{OSC}$ (not having a second frequency offset) to a quadrature divider 714. The quadrature divider 714 is configured to divide the frequency of the original oscillator output signal $S_{OSC}$ by a division factor D to generate local oscillator signals $LO_I(0°)$ and $LO_Q(90°)$. The local oscillator signals are respectively provided to an in-phase digital frequency shifter 712a and a quadrature phase digital frequency shifter 712b. The digital frequency shifters 712 are configured to selectively introduce a second frequency offset into the local oscillator signals. In particular, when the transmission circuit 700 operates in the bypass mode the digital frequency shifters 712 do not introduce the second frequency offset into the local oscillator signals. When the transmission circuit operates in the offset mode the digital frequency shifters 712 introduce the second frequency offset into the local oscillator signals to generate an offset in-phase local oscillator signal $LO_I(0°)$ and an offset quadrature phase local oscillator signal $LO_Q(90°)$.

The first frequency offset may have a relationship with the second frequency offset that causes the modulation to cancel the first and second frequency offsets (e.g., however, it will be appreciated that the design of transmission circuit 700 will alter the offset condition between the first and second frequency offsets in comparison to the transmission circuits shown in FIG. 2-6). In particular, the offset condition may comprise the second frequency offset ($f_{offset2}$) being equal to the negative value of the first frequency offset ($f_{offset1}$), since:

$$f_{COMP} = f_{bb} + f_{offset1} + f_{OSC}/D + f_{offset2}$$

$$f_{COMP} = f_{bb} + f_{offset1} + f_{OSC}/D + (-f_{offset1})$$

$$f_{COMP} = f_{bb} + f_{OSC}/D$$

Since the frequency $f_{bb}$ of the equivalent baseband signal is centered around zero hertz, the frequency $f_{COMP}$ of the composite modulated output signal is centered around a value that is equal to the frequency of the local oscillator signals, $f_{OSC}/D$.

The output of the digital frequency shifters are respectively provided to mixers 708a and 708b. The up-conversion mixers 708a and 708b are configured to modulate the analog offset equivalent baseband signals onto the offset local oscillator signals to generate mixer output signals, which are combined by an adder 716 to form a composite modulated output signal. The composite modulated output signal generated from the offset equivalent baseband and offset local oscillator signals is equal to frequency of the composite modulated output signal generated from original equivalent baseband and original local oscillator signals. The composite modulated output signal is provided to one or more amplification stages 718 before being received by a downstream antenna for transmission. FIGS. 8a-d illustrate exemplary resource block allocation schemes for a transmission circuit configured to operate according to a long term evolution (LTE) communication standard. In particular, the different resource block allocation schemes illustrate potentially harmful resource block allocation schemes that may be determined by a digital controller (e.g., corresponding to digital controller 612 configured to receive higher protocol layer information $INFO_{HPL}$) configured to change the operating mode (e.g., from a bypass mode to an offset mode, or vice versa) to provide for improved system performance.

Figure 8A:
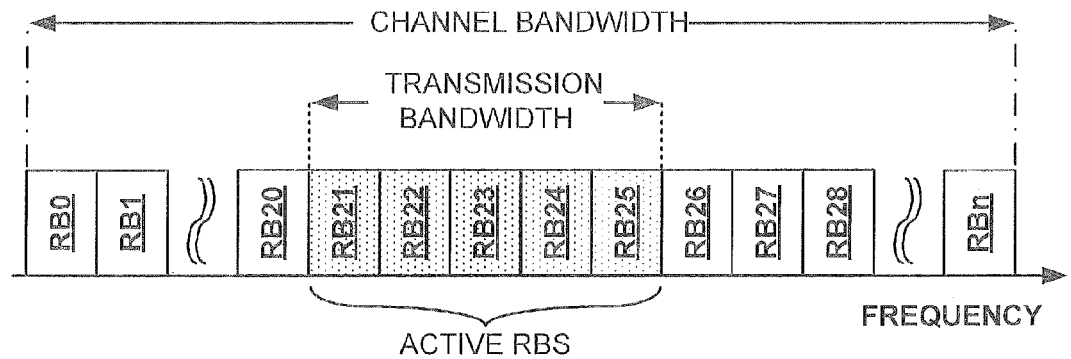
FIG. 8a-8d illustrates exemplary resource block allocation schemes for a transmission circuit utilizing a long term evolution (LTE) mobile communication standard.

In particular, FIG. 8a illustrates a typical variable bandwidth frequency structure showing the channel bandwidth, the transmission bandwidth, and resource blocks with respect to frequency (spanning horizontally across the bottom of the block diagram). A channel bandwidth is a frequency range that defines the lowest and highest frequencies of a carrier signal. The transmission bandwidth is the bandwidth of an instantaneous transmission from a transmission circuit (i.e., transmission chain), measured in resource block units. A LTE channel bandwidth is typically between 5-20 MHz, and is divided into resource blocks occupying 180 kHz in the frequency domain. A resource block (RB) is the smallest addressable unit and is comprised of a plurality of subcarriers (16 subcarriers), each having bandwidth of 15 kHz.

The LTE communication standard allows for variable bandwidth modulation schemes, using a variable number of resource blocks (RBs), to transmit a signal depending on the channel bandwidth (e.g., in general, for larger channel bandwidths more RBs are used). Therefore, depending on a desired data transmission rate more of less RBs can be allocated within a channel. However, since the total channel power is a well defined system parameter (e.g., has a well defined value that is determined based upon link situations, such as distance from a base station), when more resource blocks are allocated, the power per resource block is lower (e.g., for a certain channel power, the power spectral density of allocated RBs is inversely proportional to the number of allocated RBs).

Figure 8B:
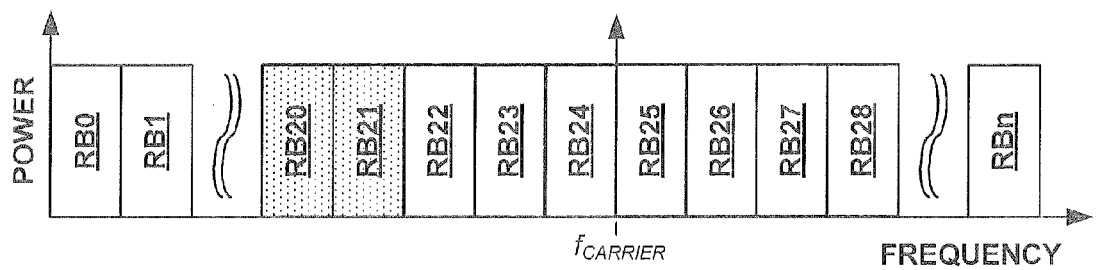
Figure 8C:
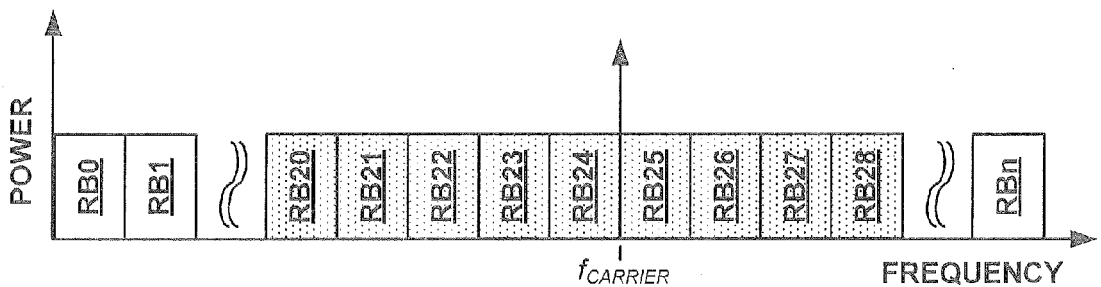
Figure 8D:
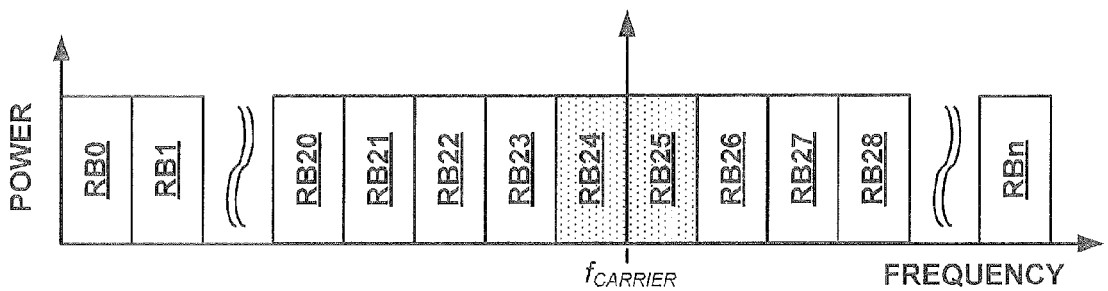

FIGS. 8b-8d illustrate various RB allocations, shown as graphs of the frequency of resource blocks (shown on x-axis) as a function of power (shown on y-axis). In FIG. 8b, data transmitted from a transmission circuit is allocated to a few resource blocks, RB20 and RB21, located away from the carrier frequency $f_{CARRIER}$ (i.e., the local oscillator signal frequency, which is assumed to be between RB24 and RB25 for purposes of this example). Since the allocated resource blocks are located away from the carrier frequency $f_{CARRIER}$, the harmonics of the allocated resource blocks are not likely to interfere with the oscillator output signal frequency and therefore a transmission circuit can operate in the bypass mode.

In FIG. 8c, data is allocated over a large number of resource blocks, including RB20-RB28. The allocation of data over a large number of resource blocks results in each resource block having a relatively low power, such that resource blocks close to the carrier frequency $f_{CARRIER}$ are low enough in power so as not to have harmonics that interfere with the oscillator output signal frequency. Therefore, in the resource block allocation of FIG. 8c, a transmission circuit can operate in the bypass mode.

In FIG. 8d, data is allocated to a few resource blocks, RB24 and RB25, allocated close to the carrier frequency $f_{CARRIER}$. Since data is allocated to a few resource blocks, the total power is distributed over a small number of resource blocks, resulting in power for the resource blocks in close proximity to the carrier frequency to be high enough to have harmonics that interfere with the oscillator output signal frequency. Therefore, in the resource block allocation of FIG. 8d, a transmission circuit cannot operate in the bypass mode and instead should be switched to the offset mode.

Figure 9:
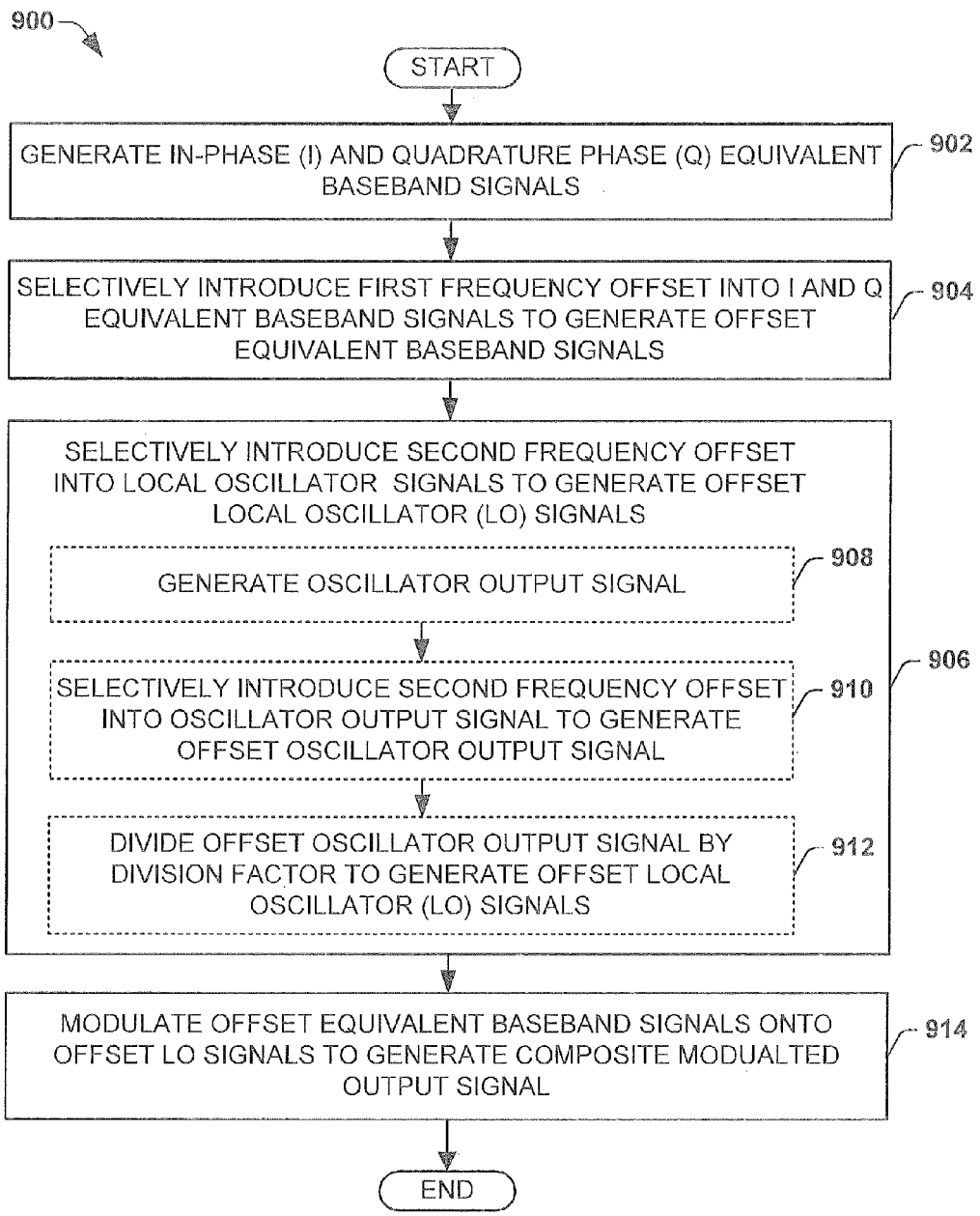
FIG. 9 is a flow diagram showing a first embodiment of a method for preventing remodulation in a transmission chain.

FIG. 9 is a flow diagram showing a first embodiment of a method for preventing remodulation in a transmission chain.

While the methods provided herein are illustrated and described below as a series of acts or events, the present disclosure is not limited by the illustrated ordering of such acts or events. For example, some acts may occur in different orders and/or concurrently with other acts or events apart from those illustrated and/or described herein. In addition, not all illustrated acts are required and the waveform shapes are merely illustrative and other waveforms may vary significantly from those illustrated. Further, one or more of the acts depicted herein may be carried out in one or more separate acts or phases.

Furthermore, the claimed subject matter may be implemented as a method, apparatus, or article of manufacture using standard programming and/or engineering techniques to produce software, firmware, hardware, or any combination thereof to control a computer to implement the disclosed subject matter (e.g., the circuits shown in FIGS. 2, 3, etc., are non-limiting examples of circuits that may be used to implement methods 900 and/or 1000). The term "article of manufacture" as used herein is intended to encompass a computer program accessible from any computer-readable device, carrier, or media. Of course, those skilled in the art will recognize many modifications may be made to this configuration without departing from the scope or spirit of the claimed subject matter.

At 902 in-phase (I) and quadrature phase (Q) equivalent baseband signals are generated.

A first frequency offset is selectively introduced into the in-phase and quadrature phase equivalent baseband signals at 904. The selective introduction of the first frequency offset may result in the generation of an offset in-phase signal and an offset quadrature phase signal, which has a frequency offset with respect to the original equivalent baseband signals (e.g., generated at 902).

At 906 a second frequency offset is selectively introduced into local oscillator signals. Selective introduction of the second frequency offset into the oscillator output signal may result in the generation of an offset oscillator output signal, which has a frequency offset with respect to an original oscillator output signal. In one embodiment, the introduction of a second frequency offset into local oscillator signals may comprise first generating an oscillator output signal at 908.

In one embodiment, the oscillator output signal may be generated from a tunable circuit, such as a phase locked loop, that may selectively provide a desired oscillator output signal frequency. Then, a second frequency offset may be selectively introduced into the oscillator output signal at 910. At 912 the offset oscillator output signal (comprising the original offset oscillator signal and the second frequency offset) are divided by a division factor to generate offset local oscillator signals.

At 914 the offset equivalent baseband signals are modulated onto the offset local oscillator signals to form a composite modulated output signal having phase and amplitude modulation. In one embodiment, wherein the second frequency offset is equal to the negative value of the first frequency offset divided by the division factor, the division and subsequent modulation of the offset local oscillator signal onto the offset equivalent baseband signals cancels the frequency offsets. Therefore, although the second frequency offset increases the frequency of the oscillator output signal to a frequency value ($f_{LO}+f_{offset2}$) that avoids remodulation, the frequency of the composite modulated output signal remains unchanged due to the introduction of the first frequency offset into the equivalent baseband signals. In one embodiment, the first and second frequency offsets may be predetermined so as to satisfy the relationship without having to perform real time calculations.

Figure 10:
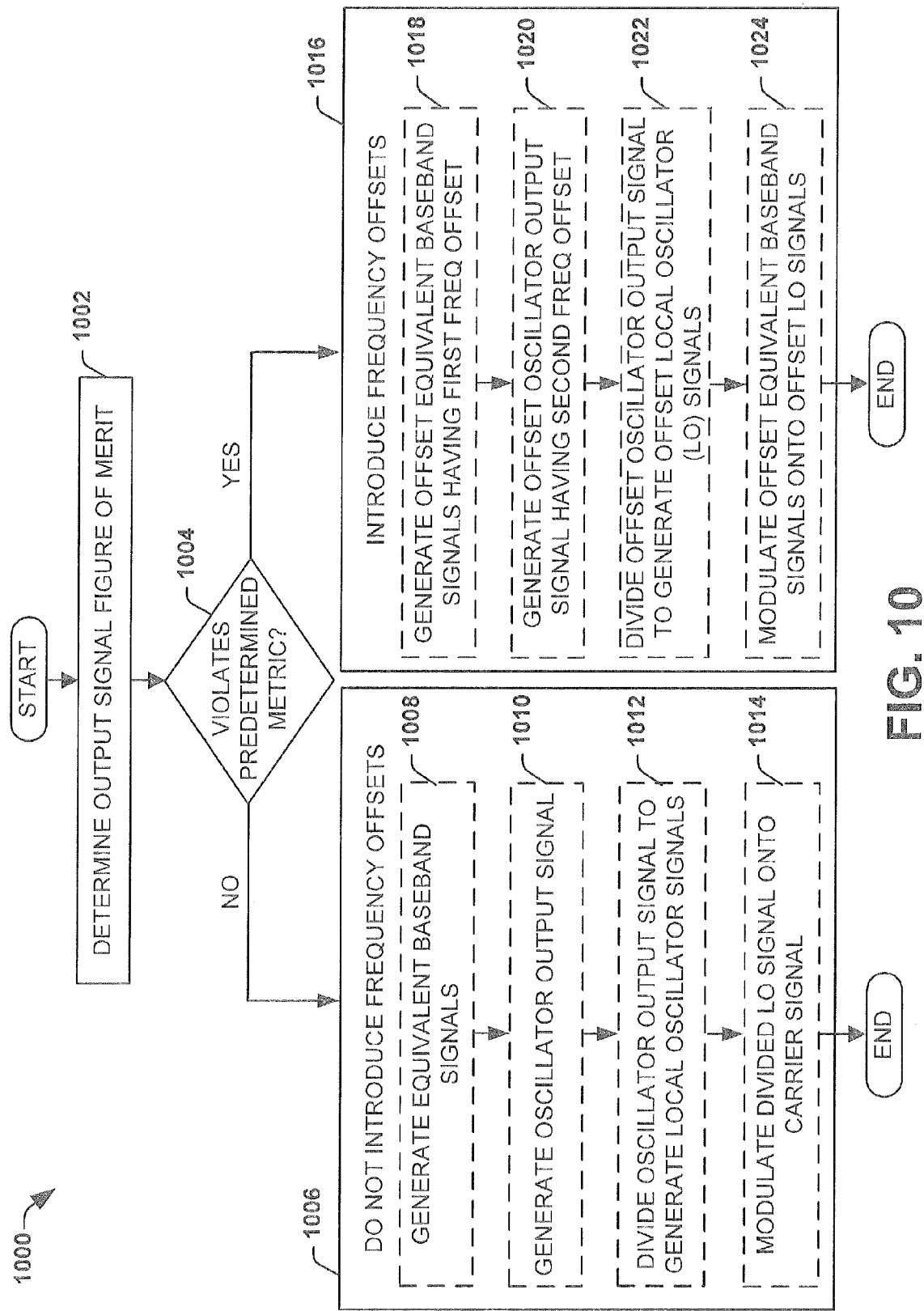
FIG. 10 is a flow diagram showing an additional embodiment of a method for preventing remodulation in a transmission chain.

The selective introduction of first and second frequency offsets may be governed by one or more metrics. As stated above, the metric may relate to one or more of the transmission output power and/or the resource block allocation of a transmission signal, for example. FIG. 10 illustrates an exemplary method 1000 of selectively introducing the first and second frequency offsets based upon a comparison of a transmission chain output signal figure of merit to a predetermined metric.

At 1002 a transmission chain output signal figure of merit is determined. The transmission chain output signal figure of merit may be determined based upon information about the transmission chain output signal (e.g., obtained as/from higher protocol layer information). For example, in one embodiment, higher protocol layer information about a number and position of requested resource blocks and/or requested transmission power may be used to determine a transmission chain output signal figure of merit.

At 1004 the transmission chain output signal figure of merit is compared to a predetermined metric. For example, in one embodiment if the figure of merit indicates a requested transmission power that is less than the predetermined metric, the method proceeds to block 1006. However, if the figure of merit indicates a requested transmission power that is greater than the predetermined metric, the method proceeds to block 1014, and offsets are introduced.

At block 1006 frequency offsets are not introduced, since the predetermined metric does not violate the figure of merit. For example, in one embodiment, if the figure of merit does not violate the predetermined metric, the method proceeds to block 1008 where equivalent baseband signals are generated at a baseband frequency $f_{bb}$. At 1010 an oscillator output signal is generated at an oscillator frequency $f_{OSC}$. The oscillator output signal is divided by a division factor at 1012 to generate local oscillator signals at a local oscillator frequency $f_{LO}$, where $f_{LO}=f_{OSC}/D$. At 1014 the equivalent baseband signals are modulated onto the local oscillator signals to generate a composite modulated signal operating at a composite frequency $f_{COMP}$ equal to the local oscillator frequency $f_{LO}$ and which is a harmonic of the oscillator output signal frequency $f_{OSC}$ (e.g., the offset oscillator frequency has a frequency of $D*f_{COMP}$).

At block 1016 frequency offsets are introduced, since the figure of merit violates the predetermined metric. For example, in one embodiment, if the figure of merit violates the predetermined metric, the method proceeds to block 1018 where offset equivalent baseband signals are generated, at a frequency having a first frequency offset value $f_{bb}+f_{offset1}$. At 1020 an offset oscillator output signal is generated at a frequency having a second frequency offset value $f_{OSC}+f_{offset2}$. The offset oscillator output signal is divided by a division factor at 1022 to generate offset local oscillator signals at a frequency value $f_{LO}+f_{offset2}/D$, where $f_{LO}=f_{OSC}/D$. At 1024 the offset equivalent baseband signals are modulated onto the offset local oscillator signals to generate a composite modulated signal at the composite frequency $f_{COMP}$, which is nota harmonic of the offset oscillator output signal's frequency $f_{OSC}+f_{offset2}$ (e.g., rather, the offset output oscillator signal has a frequency of $D*f_{COMP}+f_{offset2}$).

Although the invention has been illustrated and described with respect to one or more implementations, alterations and/or modifications may be made to the illustrated examples without departing from the spirit and scope of the appended claims. For example, although the transmission circuit described herein has been illustrated as a transmitter circuit, one of ordinary skill in the art will appreciate that the invention provided herein may be applied to transceiver circuits as well. Furthermore, in particular regard to the various functions performed by the above described components or structures (assemblies, devices, circuits, systems, etc.), the terms (including a reference to a "means") used to describe such components are intended to correspond, unless otherwise indicated, to any component or structure which performs the specified function of the described component (e.g., that is functionally equivalent), even though not structurally equivalent to the disclosed structure which performs the function in the herein illustrated exemplary implementations of the invention. In addition, while a particular feature of the invention may have been disclosed with respect to only one of several implementations, such feature may be combined with one or more other features of the other implementations as may be desired and advantageous for any given or particular application. Furthermore, to the extent that the terms "including", "includes", "having", "has", "with", or variants thereof are used in either the detailed description and the claims, such terms are intended to be inclusive in a manner similar to the term "comprising".

What is claimed is:

1. A transmission circuit, comprising:
   a first offset generation circuit configured to selectively introduce a first frequency offset into in-phase (I) and quadrature phase (Q) equivalent baseband signals received from a digital signal conditioning unit;
   a second offset generation circuit configured to selectively introduce a second frequency offset into local oscillator signals generated based upon an oscillator output signal received from a local oscillator;
   a modulation circuit configured to perform a modulation of the offset equivalent baseband signals onto offset local oscillator signals to generate a composite modulated output signal, wherein the modulation cancels the first and second frequency offsets so that the frequency of the oscillator output signal is not overlaid with harmonics of the composite modulated output signal; and
   a digital controller configured to calculate a figure of merit relating to an output signal of the transmission circuit and to introduce the first frequency offset into the baseband equivalent signals and the second frequency offset into the local oscillator signals, if the figure of merit violates a predetermined metric.

2. The circuit of claim 1, wherein the modulation circuit comprises:
   a quadrature divider configured to divide the oscillator output signal by a division factor to form the offset local oscillator signals;
   a first up-conversion mixer configured to receive one of the local oscillator signals and the offset in-phase equivalent baseband signal and to modulate the offset in-phase equivalent baseband signal onto the one of the offset local oscillator signals; and
   a second up-conversion mixer configured to receive another one of the local oscillator signals and the offset quadrature phase equivalent baseband signal and to modulate the offset quadrature phase equivalent baseband signal onto the another one of the offset local oscillator signals.

3. The circuit of claim 2,
   wherein the second offset generation circuit comprises the local oscillator, which is configured to generate a variable frequency signal comprising the oscillator output signal;
   wherein the local oscillator varies the frequency of the oscillator output signal to selectively introduce the second frequency offset into the oscillator output signal;
   wherein the first frequency offset is equal to the opposite numeric value of the second frequency offset multiplied by the division factor.

4. The circuit of claim 2, wherein the second offset generation circuit comprises:
   a first digital frequency shifter configured to receive the one of the local oscillator signals from the quadrature divider and to introduce the second frequency offset into the one of the local oscillator signals; and
   a second digital frequency shifter configured to receive the another one of the local oscillator signals from the quadrature divider and to introduce the second frequency offset into the another one of the local oscillator signals,
   wherein the second frequency offset is equal to and has an opposite numeric value of the first frequency offset.

5. The circuit of claim 2, further comprising:
   a digital controller configured to generate a first control signal that selectively controls the introduction of the first frequency offset and a second control signal that selectively controls the second frequency offset based upon information about an output signal of the transmission circuit.

6. The circuit of claim 5, wherein the information about the output signal of the transmission circuit comprises transmit output power.

7. The circuit of claim 5, wherein the first offset generation circuit comprises:
   a digital frequency shifter configured to shift the frequency of the equivalent baseband signals by the first frequency offset;
   a first multiplexor coupled between the digital frequency shifter and the first up-conversion mixer, the first multiplexor configured to receive an original in-phase equivalent baseband signal and the offset in-phase equivalent baseband signal and to output either the original in-phase equivalent baseband signal or the offset in-phase equivalent baseband signal based upon the first control signal; and
   a second multiplexor coupled between the digital frequency shifter and the second up-conversion mixer, the second multiplexor configured to receive an original quadrature phase equivalent baseband signal and the offset quadrature phase equivalent baseband signal and to output either the original quadrature phase equivalent baseband signal or the offset quadrature phase equivalent baseband signal based upon the first control signal.

8. The circuit of claim 7, further comprising:
   a first digital-to-analog converter coupled between the first multiplexor and the first up-conversion mixer, wherein the first digital-to-analog converter is configured to convert either the original in-phase equivalent baseband signal or the offset in-phase equivalent baseband signal from a digital signal to an analog signal; and
   a second digital-to-analog converter coupled between the second multiplexor and the second up-conversion mixer, wherein the second digital-to-analog converter is configured to convert either the original in-phase equivalent baseband signal or the offset in-phase equivalent baseband signal from an digital signal to an analog signal.

9. The circuit of claim 1,
wherein the transmission circuit is configured to operate according to a long term evolution (LTE) communication standard such that a communication comprises a plurality of resource blocks, and
wherein a digital controller is configured to introduce the first frequency offset into the baseband equivalent signals based upon positions of a number of resource blocks used by the transmission circuit.

10. A transmission circuit, comprising:
a first offset generation circuit connected to an in-phase path and a quadrature phase path and configured to selectively introduce a first frequency offset into original baseband equivalent signals, received from a digital signal conditioning unit, to form offset baseband equivalent signals;
a second offset generation circuit configured to selectively introduce a second frequency offset into original local oscillator signals output from a local oscillator to form offset local oscillator signals having the second frequency offset, which are provided to the in-phase path and the quadrature phase path;
a digital controller configured to operate in a bypass mode and an offset mode,
wherein during the bypass mode the original equivalent baseband signals are selectively modulated onto the original local oscillator signals to generate a modulated composite output signal having a first frequency,
wherein during the offset mode the offset equivalent baseband signals are selectively modulated onto the offset local oscillator signals to generate the modulated composite output signal having the first frequency,
wherein the first frequency or harmonics of the first frequency does not interfere with frequency of the offset oscillator output signal.

11. The circuit of claim 10, further comprising:
a first up-conversion mixer configured to receive one of the local oscillator signals and the offset in-phase equivalent baseband signal and to modulate the offset in-phase equivalent baseband signal onto the one of the offset local oscillator signals; and
a second up-conversion mixer configured to receive another one of the local oscillator signals and the offset quadrature phase equivalent baseband signal and to modulate the offset quadrature phase equivalent baseband signal onto the another one of the offset local oscillator signals.

12. The circuit of claim 11,
wherein the second offset generation circuit comprises the local oscillator, which is configured to generate a variable frequency signal comprising the oscillator output signal;
wherein the local oscillator varies the frequency of the oscillator output signal to selectively introduce the second frequency offset into the oscillator output signal;
wherein the first frequency offset is equal to the opposite numeric value of the second frequency offset multiplied by the division factor.

13. The circuit of claim 12, wherein the second offset generation circuit comprises:
a first digital frequency shifter configured to receive the one of the local oscillator signals from the quadrature divider and to introduce the second frequency offset into the one of the local oscillator signals; and
a second digital frequency shifter configured to receive the another one of the local oscillator signals from the quadrature divider and to introduce the second frequency offset into the another one of the local oscillator signals,
wherein the second frequency offset is equal to and has an opposite numeric value of the first frequency offset.

14. The circuit of claim 10, wherein the digital controller is configured to calculate a figure of merit relating to an output signal of the transmission circuit and to introduce the first frequency offset into the baseband equivalent signals and the second frequency offset into the local oscillator signals, if the figure of merit violates a predetermined metric.

15. The circuit of claim 10,
wherein the transmission circuit is configured to operate according to a long term evolution (LTE) communication standard such that a communication comprises a plurality of resource blocks, and
wherein the digital controller is configured to introduce the first frequency offset into the baseband equivalent signals based upon positions of a number of resource blocks used by the transmission circuit.

16. The transmission circuit of claim 10, wherein the second offset generation circuit is connected to an input terminal of the local oscillator and is configured to control operation of the local oscillator in a manner that causes the local oscillator to selectively introduce a second frequency offset into the original oscillator signals output from the local oscillator.

17. A method for preventing remodulation in a transmission chain, comprising:
selectively introducing a first frequency offset into an in-phase equivalent baseband signal and a quadrature phase equivalent baseband signal;
offsetting a local oscillator signal by a second frequency offset to vary a frequency of a local oscillator output signal by introducing the second frequency offset to form an offset local oscillator signal having the second frequency offset for use in forming in-phase path and quadrature phase path offset local oscillator signals, respectively; and
modulating the offset in-phase and quadrature phase equivalent baseband signals onto the in-phase path and quadrature phase path offset local oscillator signals, respectively, to generate a composite modulated output signal, wherein the modulation cancels the first and second frequency offsets so that the frequency of the offset oscillator output signal is not overlaid with harmonics of the composite modulated output signal.

18. The method of claim 17, wherein forming in-phase path and quadrature phase path offset local oscillator signals comprises:
operating the local oscillator to selectively introduce a second frequency offset into the local oscillator signal output from the local oscillator; and
dividing the local oscillator signal output from the local oscillator by a division factor to generate the in-phase path and quadrature phase path offset local oscillator signals;
wherein the first frequency offset is equal to the opposite of the second frequency offset multiplied by the division factor.

19. The method of claim 17, wherein forming in-phase path and quadrature phase path offset local oscillator signals comprises:

dividing the local oscillator signal output from the local oscillator by a division factor to generate in-phase path and quadrature phase path divided local oscillator signals; and selectively introducing a second frequency offset into the in-phase path and quadrature phase path divided local oscillator signals to generate the in-phase path and quadrature phase path offset local oscillator signals;

wherein the first frequency offset is equal to the opposite of the second frequency offset.

20. The method of claim 17, further comprising:

determining a figure of merit relating to an output signal of the transmission chain; and comparing the figure of merit to a predetermined metric;

wherein if the figure of merit violates the predetermined metric the first frequency offset is not introduced into the equivalent baseband signal and the second frequency offset is not introduced into the local oscillator signals output from the local oscillator;

wherein if the figure of merit does not violate the predetermined metric the first frequency offset is introduced into the equivalent baseband signal and the second frequency offset is introduced into the local oscillator signals output from the local oscillator.

* * * * *